United States Patent
Jang et al.

(10) Patent No.: US 8,415,841 B2
(45) Date of Patent: Apr. 9, 2013

(54) FAN MOTOR FOR CIRCULATING COOLED AIR

(75) Inventors: Jeong Cheol Jang, Gwangju (KR); Gyeong Su Park, Gwangju (KR)

(73) Assignee: New Motech Co., Ltd., Gwangju (KR)

( * ) Notice: Subject to any disclaimer, the term of this patent is extended or adjusted under 35 U.S.C. 154(b) by 0 days.

(21) Appl. No.: 13/422,456

(22) Filed: Mar. 16, 2012

(65) Prior Publication Data
US 2012/0169155 A1   Jul. 5, 2012

Related U.S. Application Data

(63) Continuation of application No. PCT/KR2010/007308, filed on Oct. 23, 2010.

(30) Foreign Application Priority Data

Nov. 4, 2009   (KR) .......................... 10-2009-0105724

(51) Int. Cl.
*H02K 1/04* (2006.01)
(52) U.S. Cl.
USPC .............................................. 310/43; 310/90
(58) Field of Classification Search .................... 310/43, 310/67 R, 61–62, 90
See application file for complete search history.

(56) References Cited

U.S. PATENT DOCUMENTS

| | | | |
|---|---|---|---|
| 4,682,065 A * | 7/1987 | English et al. ................... | 310/90 |
| 4,829,208 A * | 5/1989 | Uchino ........................... | 310/268 |
| 6,798,091 B2 * | 9/2004 | Kudou et al. .................... | 310/43 |
| 7,825,550 B2 * | 11/2010 | Yamada et al. .................. | 310/43 |
| 2002/0113519 A1 * | 8/2002 | Brown ............................ | 310/254 |
| 2004/0145250 A1 * | 7/2004 | Kudo et al. ..................... | 310/43 |
| 2005/0196282 A1 | 9/2005 | Lee et al. | |
| 2008/0054735 A1 * | 3/2008 | Yoshida et al. ................. | 310/43 |
| 2011/0074230 A1 * | 3/2011 | Hasegawa et al. .............. | 310/43 |
| 2012/0121426 A1 * | 5/2012 | Kitamura .................. | 416/197 R |

FOREIGN PATENT DOCUMENTS

| | | |
|---|---|---|
| JP | 2002-171716 A | 6/2002 |
| JP | 2002-218702 A | 8/2002 |
| KR | 10-2005-0089658 A | 9/2005 |
| KR | 10-2008-0020138 A | 3/2008 |
| KR | 10-2008-0041158 A | 5/2008 |
| KR | 10-2008-0105795 A | 12/2008 |
| KR | 10-2009-0025539 A | 3/2009 |
| KR | 10-2009-0088233 A | 8/2009 |

\* cited by examiner

*Primary Examiner* — Thanh Lam
(74) *Attorney, Agent, or Firm* — Sherr & Jiang, PLLC

(57) ABSTRACT

A fan motor for circulating cooled air including: a stator assembly having a stator core having teeth ends protruded annularly outwardly and coils wound on the teeth ends of the stator core and molded out of resin to have a donut-like shape having a bearing insertion hole formed to be passed vertically through the center thereof; a bearing assembly adapted to be insertedly fixed into the bearing insertion hole of the stator assembly; and a rotor fan assembly having a rotor having a cup-shaped case, a rotor shaft formed in the center of the case in such a manner as to be passed vertically through the center of the case, and magnetic poles formed along the inner periphery of the case, and a fan having a hub coupled to the top end periphery of the rotor shaft of the rotor and blades disposed around the hub.

6 Claims, 4 Drawing Sheets

FAN MOTOR FOR CIRCULATING COOLED AIR

CROSS REFERENCE TO PRIOR APPLICATIONS

This application claims the benefit under 35 U.S.C.§120 and §365(c) to a prior PCT International Patent Application No. PCT/KR2010/007308 (filed on Oct. 23, 2010 and designating the U.S.), which claims priority to Korean Patent Application No. 10-2009-0105724 (filed on Nov. 4, 2009), which are all hereby incorporated by reference in their entirety.

BACKGROUND

In general, so as to circulate cooled air in a refrigerator, a fan motor having a fan and a motor coupled to each other is disposed in the interior of the refrigerator, and in this case, a fan motor, which has a compact size with respect to the directions of diameter and axis thereof, is popularly used in consideration of the installation space in the refrigerator.

Conventional fan motors for circulating cooled air are disclosed in Korean Patent Publication Laid-Open Nos. 10-2008-0020138 and 10-2008-0041158. Each of the conventional fan motors largely includes: a motor having a stator having a shaft-supporting portion formed in the center thereof and core teeth ends exposed to the outer periphery thereof and a rotor having a rotor shaft insertedly supported into the shaft-supporting portion and a case having magnets attached annularly therealong in such a manner as to be positioned opposite to the core teeth ends, the case being coupled fittingly to the rotor shaft; and a fan having a hub coupled fittingly to the rotor shaft of the rotor.

By the way, the conventional fan motor for circulating cooled air has a structure wherein a stator core, coils and a circuit board constituting the stator assembly are exposed to the outside to make water contained in the cooled air penetrated therethrough, thereby causing the corrosion of the stator assembly.

Also, the conventional fan motor for circulating cooled air has a structure wherein the hub of the fan is coupled to the rotor shaft of the rotor by means of injection or press-fitting, such that the fan is shaken by the rotation of the motor to cause the rotor shaft to be separated from the hub of the fan.

Further, the conventional fan motor for circulating cooled air has a structure wherein the case of the rotor has a cup-like shape made of a metal material and the magnets are attached on the case of the rotor, thereby making it more complicated to manufacture the rotor.

SUMMARY

Accordingly, the present invention has been made in view of the above-mentioned problems occurring in the prior art, and it is an object of the present invention to provide a fan motor for circulating cooled air that has a structure wherein a stator core, coils and a circuit board constituting a stator assembly are molded out of resin to prevent water contained in the cooled air from being penetrated therethrough.

It is another object of the present invention to provide a fan motor for circulating cooled air that has a structure wherein in a state where a rotor shaft is inserted into a hub of a fan, the hub is surrounded and pressurized elastically by means of a spring to prevent the fan from being separated from the rotor shaft.

It is still another object of the present invention to provide a fan motor for circulating cooled air that has a structure wherein a case of a rotor is made of a resin magnet by means of injection molding and magnetic poles are formed inside the case by means of Nd injection, thereby easily manufacturing the rotor.

The above objects and other objects of the present invention will be easily achieved by a preferred embodiment of the present invention as will be described below.

To accomplish the above objects, according to the present invention, there is provided a fan motor for circulating cooled air including: a stator assembly having a stator core having teeth ends protruded annularly outwardly and coils wound on the teeth ends of the stator core and molded out of resin to have a donut-like shape having a bearing insertion hole formed to be passed vertically through the center thereof; a bearing assembly adapted to be insertedly fixed into the bearing insertion hole of the stator assembly; and a rotor fan assembly having a rotor having a cup-shaped case, a rotor shaft formed in the center of the case in such a manner as to be passed vertically through the center of the case, and magnetic poles formed along the inner periphery of the case, and a fan having a hub coupled to the top end periphery of the rotor shaft of the rotor and blades disposed around the hub, such that the rotor shaft is rotatably supported against the bearing assembly to allow the magnetic poles of the rotor to be positioned opposite to the teeth ends of the stator assembly around the teeth ends of the stator assembly.

According to the present invention, desirably, the fan 33 has a compression portion 33c protruded upwardly from the hub 33a, a shaft-fixing hole 33b formed to be extended from the underside of the hub 33a to the compression portion 33c, and a compression member 33e adapted to surroundingly pressurize the compression portion 33c in the state where the rotor shaft 31 is inserted at the top end periphery thereof into the shaft-fixing hole 33b.

According to the present invention, desirably, the case 32 of the rotor is formed by first injection molding out of a resin magnet to have the cup-like shape, in the state where the rotor shaft 31 is inserted to be coupled to the case 32, and the magnetic poles 32b of the rotor are formed by secondary injection molding out of resin magnets in such a manner as to be attached on the inner periphery of a side wall 32a of the case 32, in the state where the case 32 injection-molded out of the resin magnet is inserted.

According to the present invention, desirably, the hub 33a of the fan 33 has a bell-like shape such that concave space is formed in the lower portion of the fan 33, and the blades 33d are provided at the upper side of the bell-shaped hub 33a.

Under the above-mentioned structure, the fan motor for circulating cooled air according to the present invention has the following advantages:

Firstly, the stator core, the coils and the circuit board constituting the stator assembly are molded out of resin, thereby preventing water contained in the cooled air from being penetrated therethrough.

Secondly, in the state where the rotor shaft is inserted into the hub of the fan, the hub is surrounded and pressurized elastically by means of the spring, thereby preventing the fan from being separated from the rotor shaft.

Lastly, the case of the rotor is made of a resin magnet by means of injection molding and the magnetic poles are formed inside the case by means of Nd injection, thereby easily manufacturing the rotor.

DRAWINGS

DESCRIPTION

Hereinafter, an explanation on a fan motor for circulating cooled air according to the present invention will be in detail given with reference to the attached drawings.

Figure 1:
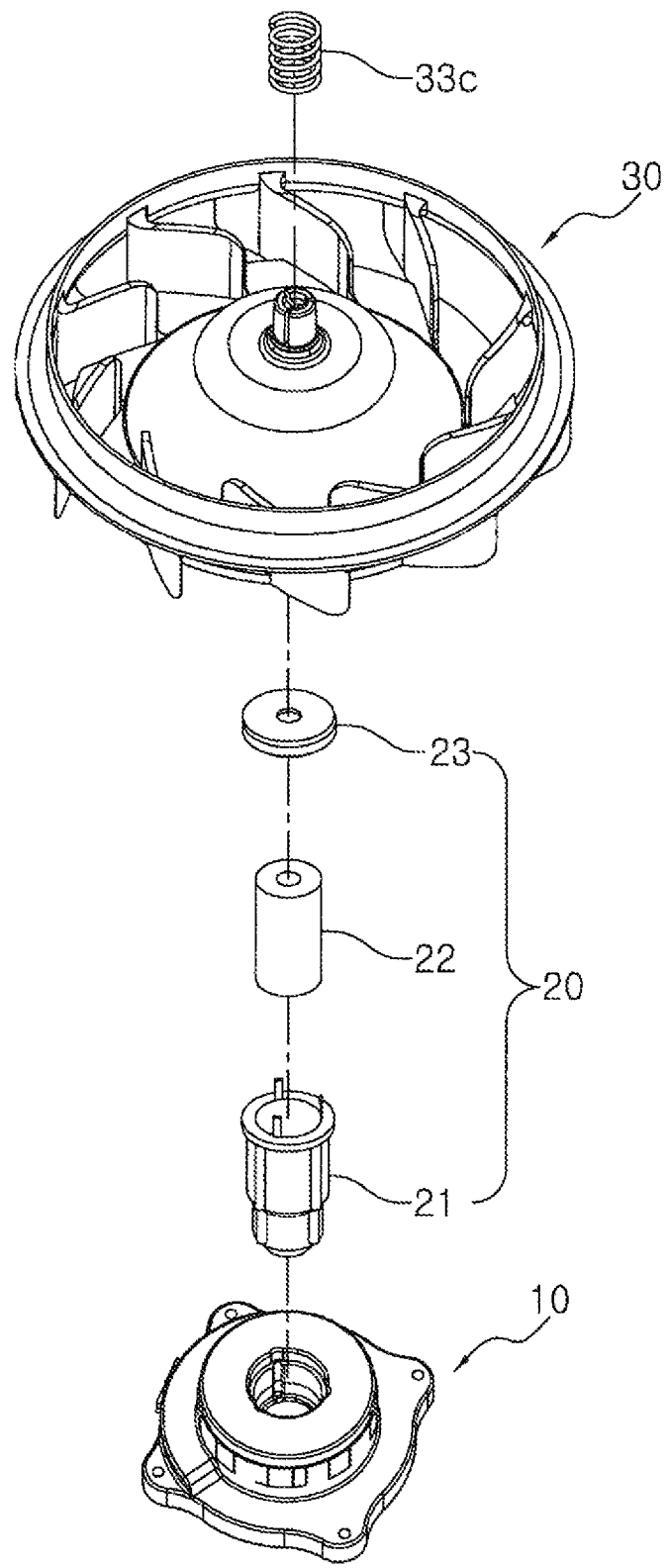
FIG. 1 is an exploded perspective view showing a fan motor for circulating cooled air according to the present invention.
Figure 2:
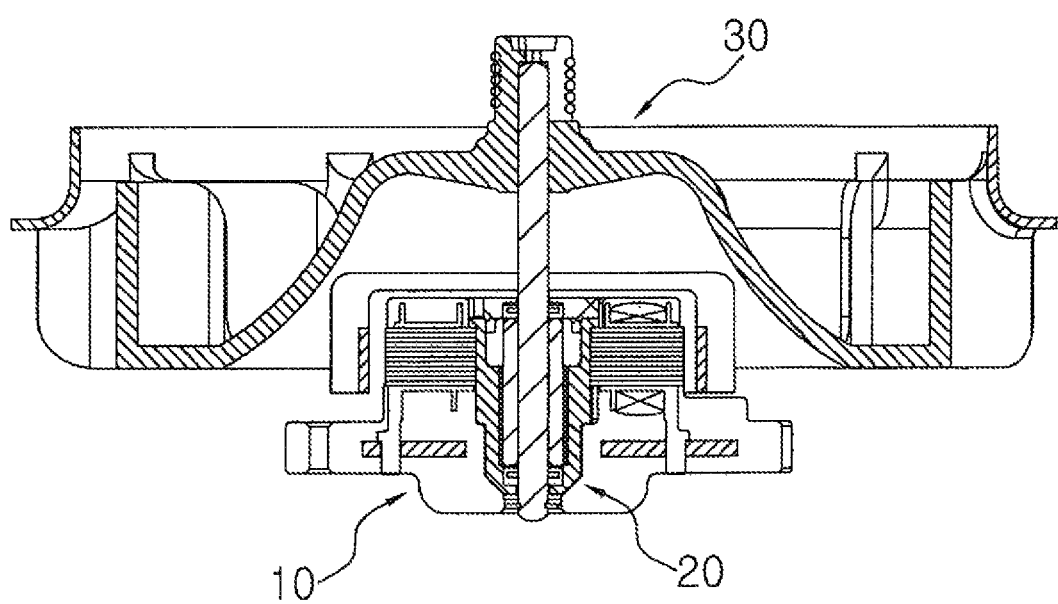
FIG. 2 is a sectional view showing the fan motor for circulating cooled air according to the present invention.
Figure 3:
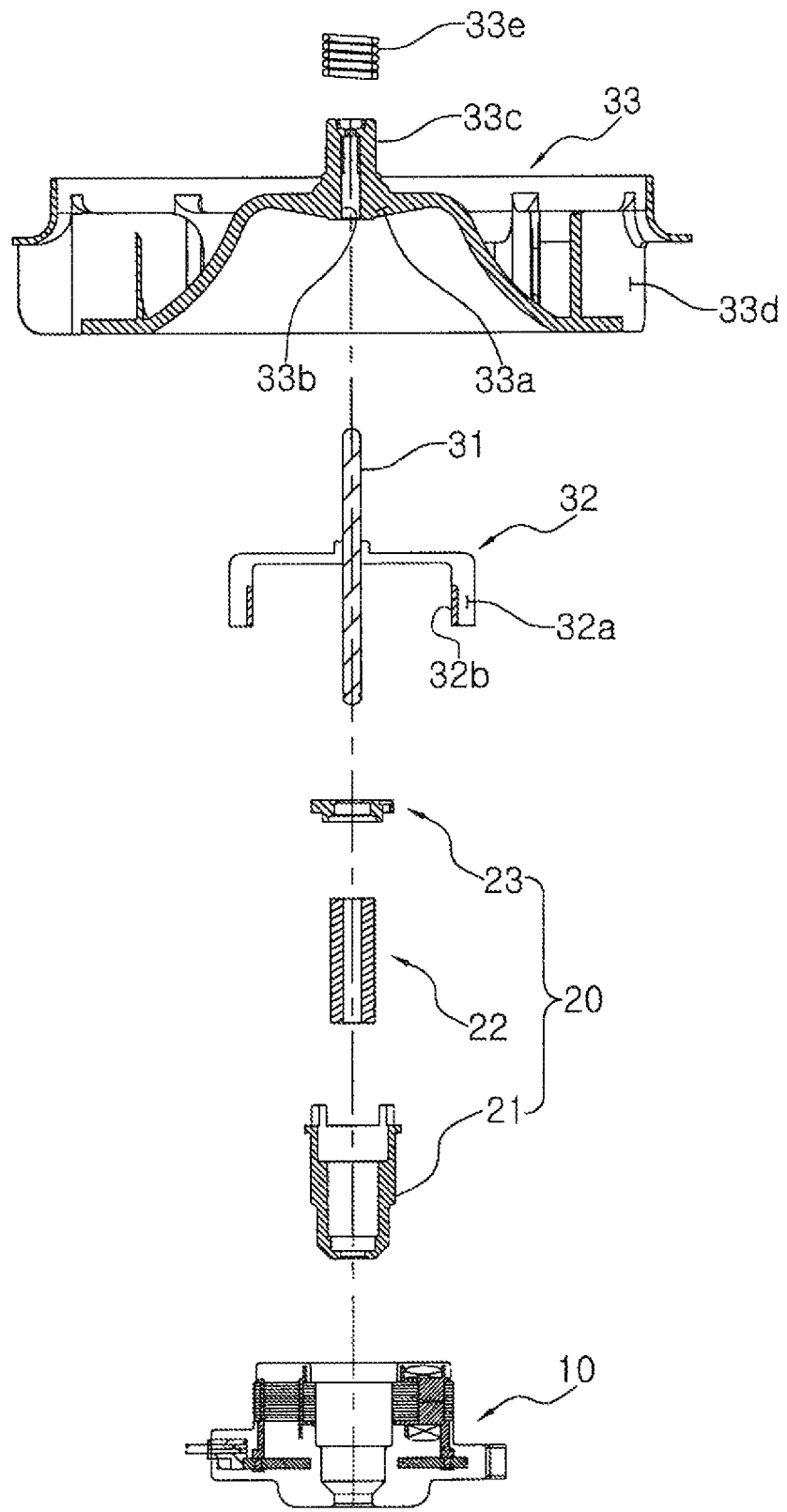
FIG. 3 is an exploded sectional view showing the fan motor for circulating cooled air according to the present invention.
Figure 4:
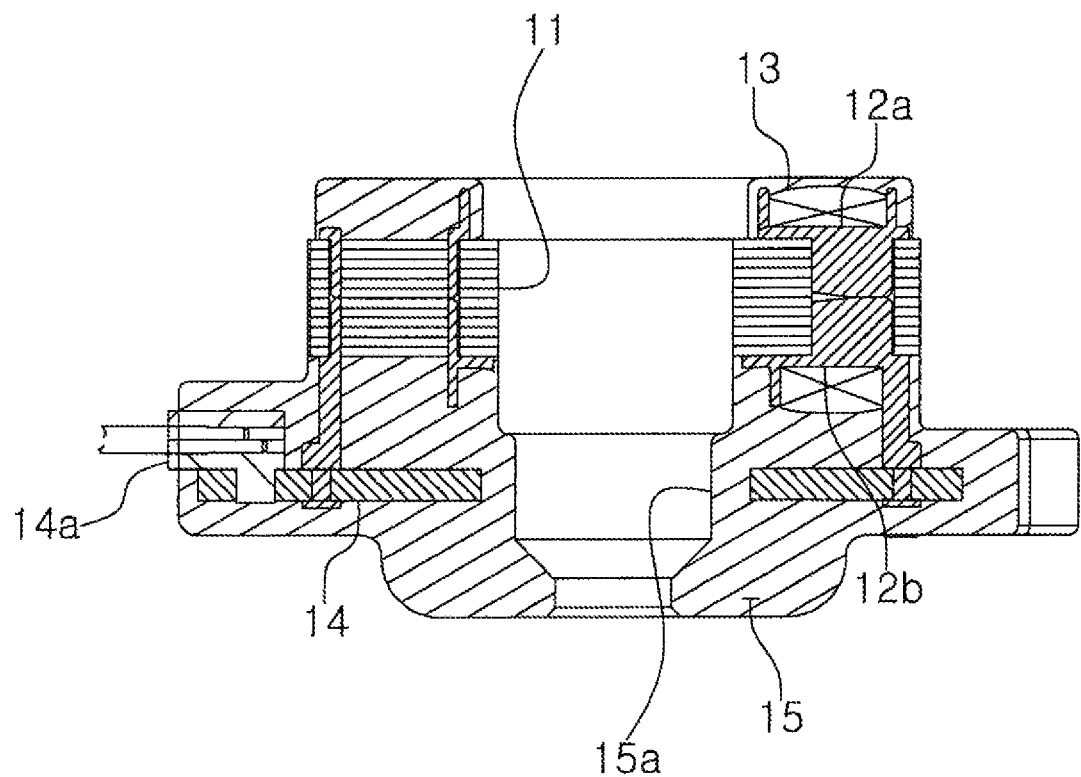
FIG. 4 is a sectional view showing a stator assembly of the fan motor for circulating cooled air according to the present invention.

FIG. 1 is an exploded perspective view showing a fan motor for circulating cooled air according to the present invention, FIG. 2 is a sectional view showing the fan motor for circulating cooled air according to the present invention, FIG. 3 is an exploded sectional view showing the fan motor for circulating cooled air according to the present invention, and FIG. 4 is a sectional view showing a stator assembly of the fan motor for circulating cooled air according to the present invention.

Referring to the drawings, the fan motor for circulating cooled air according to the present invention largely includes a stator assembly 10, a bearing assembly 20, and a rotor fan assembly 30.

The stator assembly 10 is a part for constituting a motor together with a rotor of the rotor fan assembly 30. According to the present invention, the stator assembly 10 is molded out of BMC (Bulk Molding Compound) resin to have a watertight structure.

The stator assembly 10 includes a stator core 11, upper and lower insulators 12a and 12b, coils 13, a circuit board 14 and a molding 15. The stator core 11 is formed by laminating the stacked layers of steel plates and has a plurality of teeth protruded annularly outwardly. The upper and lower insulators 12a and 12b serve to insulate the stator core 11 from the coils 13 wound on the teeth of the stator core 11. The upper and lower insulators 12a and 12b are made by resin injection molding and coupled to the upper and lower sides of the stator core 11 to cover the stator core 11. The lower insulator 12b is coupled at the lower side thereof to the circuit board 14. The coils 13 are controlled by means of a control circuit formed on the circuit board 14 and form a magnetic force when currents are applied thereto. The coils 13 are wound on the teeth of the stator core 11 insulated by means of the covering of the upper and lower insulators 12a and 12b. The circuit board 14 includes the control circuit that controls the currents supplied to the coils 13 so as to perform starting of the rotation of a rotor as will be explained below and control the rotation of the rotor. Further, the circuit board 14 has a terminal portion 14a formed at one side edge thereof so as to be connected to an external terminal (not shown in the drawings). The circuit board 14 is coupled to the lower side of the lower insulator 12b coupled to the stator core 11. The molding 15 is formed to surround the stator core 11, the upper and lower insulators 12a and 12b, the coils 13 and the circuit board 14 that are coupled to each other as mentioned above. In a state where the assembly made by coupling the stator core 11, the upper and lower insulators 12a and 12b, the coils 13 and the circuit board 14 is inserted, the molding 15 is made by means of BMC injection to have a donut-like shape having a bearing insertion hole 15a formed to be passed vertically through the center thereof. At this time, the terminal portion 14a of the circuit board 14 is exposed outside one side of the circuit board 14 at the lower portion of the molding 15, and the ends of the teeth of the stator core 11 positioned opposite to the magnetic poles 32b of the rotor as will be described later are exposed outside at the upper portion of the molding 15.

The bearing assembly 20 is provided to rotatably support the rotor shaft 31 of the rotor fan assembly 30. Referring to the drawings, the bearing assembly 20 has a generally cylindrical shape and includes a bearing housing 21 insertedly fixed into the bearing insertion hole 15a of the stator assembly 10, a bearing 22 insertedly mounted into the bearing housing 21 and adapted to insert the rotor shaft 31 thereinto so as to rotatably support the rotor shaft 31 thereagainst, and a housing cap 23 coupled to one end of the bearing housing 21 so as to allow the bearing 22 to be fixed into the bearing housing 21 without any escaping.

The rotor fan assembly 30 includes: a rotor rotating with respect to the stator assembly 10; and the fan 33 coupled to the rotor in such a manner as to be rotated as one unit together with the rotor.

The rotor is configured to rotate by means of a magnetic force generated between the rotor and the stator assembly 10 and includes the rotor shaft 31 and the case 32.

The rotor shaft 31 is inserted into the bearing 22 of the bearing assembly 20 and is rotatably supported with respect to the stator assembly 10.

The case 32 is configured to have the magnetic poles 32b positioned opposite to the magnetic poles formed on the ends of the teeth of the stator core 11 of the stator assembly 10 and is coupled as one unit to the rotor shaft 31. Referring to the drawings, the case 32 has a cup-like shape and is coupled at the center thereof to the rotor shaft 31 in such a manner as to permit the rotor shaft 31 to be passed vertically therethrough. The case 32 has a side wall 32a and the magnetic poles 32b formed along the inner periphery of the side wall 32a. The case 32 is made by pressing steel sheets to allow the side wall 32a to have a function of a back yoke, and magnets are attached on the inner side of the side wall 32a to form the magnetic poles 32b. However, it is desirable that the case 32 is made by the injection of resin magnet two times, which advantageously provides the easiness of manufacturing process and the reduction of manufacturing cost. In more detail, the case 32 is formed by first injection molding out of a resin magnet to have the cup-like shape, and at this time, the rotor shaft 31 is inserted and coupled integrally to the case 32. Next, in the state where the case 32 injection-molded first out of the resin magnet is inserted, the magnetic poles 32b are formed by second injection molding out of Nd resin magnets in such a manner as to be positioned along the inner side of the side wall 32a of the case 32.

While the fan 33 is being rotated as one unit to the rotor, it forms the flow of cooled air. The fan 33 has the hub 33a formed in the center thereof in such a manner as to be coupled to the top end periphery of the rotor shaft 31 of the rotor and blades 33d provided around the hub 33a.

Especially, the hub 33a of the fan 33 has a bell-like shape such that concave space is formed in the lower portion of the fan 33 to receive the rotor and the stator assembly 10 placed opposite to the rotor thereinto, which decreases the entire height of the fan 33 to provide a compact size. The blades 33d are provided at the upper side of the bell-shaped hub 33a.

On the other hand, so as to prevent the rotor shaft 31 insertedly fixed at the top end periphery thereof into a shaft-fixing hole 33b of the hub 33a from being shaken by means of continuous vibration or from escaping from the shaft-fixing hole 33b, a compression portion 33c is provided to receive the compression applied from a compression member 33e. Referring to the drawings, the fan 33 has the compression portion 33c protruded upwardly from the hub 33a and the shaft-fixing hole 33b formed to be extended from the underside of the hub 33a to the compression portion 33c. The rotor shaft 31 is inserted (desirably, press-fitted) at the top end periphery thereof into the shaft-fixing hole 33b so as to be positioned at the inside of the compression portion 33c, and at the state, the compression portion 33c is surroundingly pressurized by means of the compression member 33e, thereby allowing the rotor shaft 31 to be reliably fixed to the hub 33a. In the drawings, an example of the compression member 33e is a coil spring having a diameter expanded and decreased through elastic deformation.

According to the rotor fan assembly 30, the rotor shaft 31 is rotatably supported against the bearing 22 of the bearing assembly 20 such that the magnetic poles 32b of the case 32 of the rotor are positioned opposite to the ends of the teeth of the stator core 11 of the stator assembly 10 around the ends of the teeth of the stator core 11 of the stator assembly 10.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

According to the present invention, there is provided the fan motor for circulating cooled air in which the stator core, the coils and the circuit board constituting the stator assembly are molded out of resin to prevent the water contained in the cooled air from being penetrated therethrough.

The invention claimed is:

1. A fan motor for circulating cooled air, comprising:
a stator assembly having a stator core having teeth ends protruded annularly outwardly and coils wound on the teeth ends of the stator core and molded out of resin to have a donut-like shape having a bearing insertion hole formed to be passed vertically through the center thereof;
a bearing assembly adapted to be insertedly fixed into the bearing insertion hole of the stator assembly; and
a rotor fan assembly having a rotor having a cup-shaped case, a rotor shaft formed in the center of the case in such a manner as to be passed vertically through the center of the case, and magnetic poles formed along the inner periphery of the case, and a fan having a hub coupled to the top end periphery of the rotor shaft of the rotor and blades disposed around the hub, such that the rotor shaft is rotatably supported against the bearing assembly to allow the magnetic poles of the rotor to be positioned opposite to the teeth ends of the stator assembly around the teeth ends of the stator assembly.

2. The fan motor for circulating cooled air according to claim 1, wherein the fan has a compression portion protruded upwardly from the hub, a shaft-fixing hole formed to be extended from the underside of the hub to the compression portion, and a compression member adapted to surroundingly pressurize the compression portion in the state where the rotor shaft is inserted at the top end periphery thereof into the shaft-fixing hole.

3. The fan motor for circulating cooled air according to claim 1, wherein the case of the rotor is formed by first injection molding out of a resin magnet to have the cup-like shape, in the state where the rotor shaft is inserted to be coupled to the case, and the magnetic poles of the rotor are formed by second injection molding out of resin magnets in such a manner as to be attached on the inner periphery of a side wall of the case, in the state where the case injection-molded out of the resin magnet is inserted.

4. The fan motor for circulating cooled air according to claim 1, wherein the hub of the fan has a bell-like shape such that concave space is formed in the lower portion of the fan, and the blades are provided at the upper side of the bell-shaped hub.

5. The fan motor for circulating cooled air according to claim 2, wherein the case of the rotor is formed by first injection molding out of a resin magnet to have the cup-like shape, in the state where the rotor shaft is inserted to be coupled to the case, and the magnetic poles of the rotor are formed by second injection molding out of resin magnets in such a manner as to be attached on the inner periphery of a side wall of the case, in the state where the case injection-molded out of the resin magnet is inserted.

6. The fan motor for circulating cooled air according to claim 2, wherein the hub of the fan has a bell-like shape such that concave space is formed in the lower portion of the fan, and the blades are provided at the upper side of the bell-shaped hub.

* * * * *